Patented Apr. 22, 1947

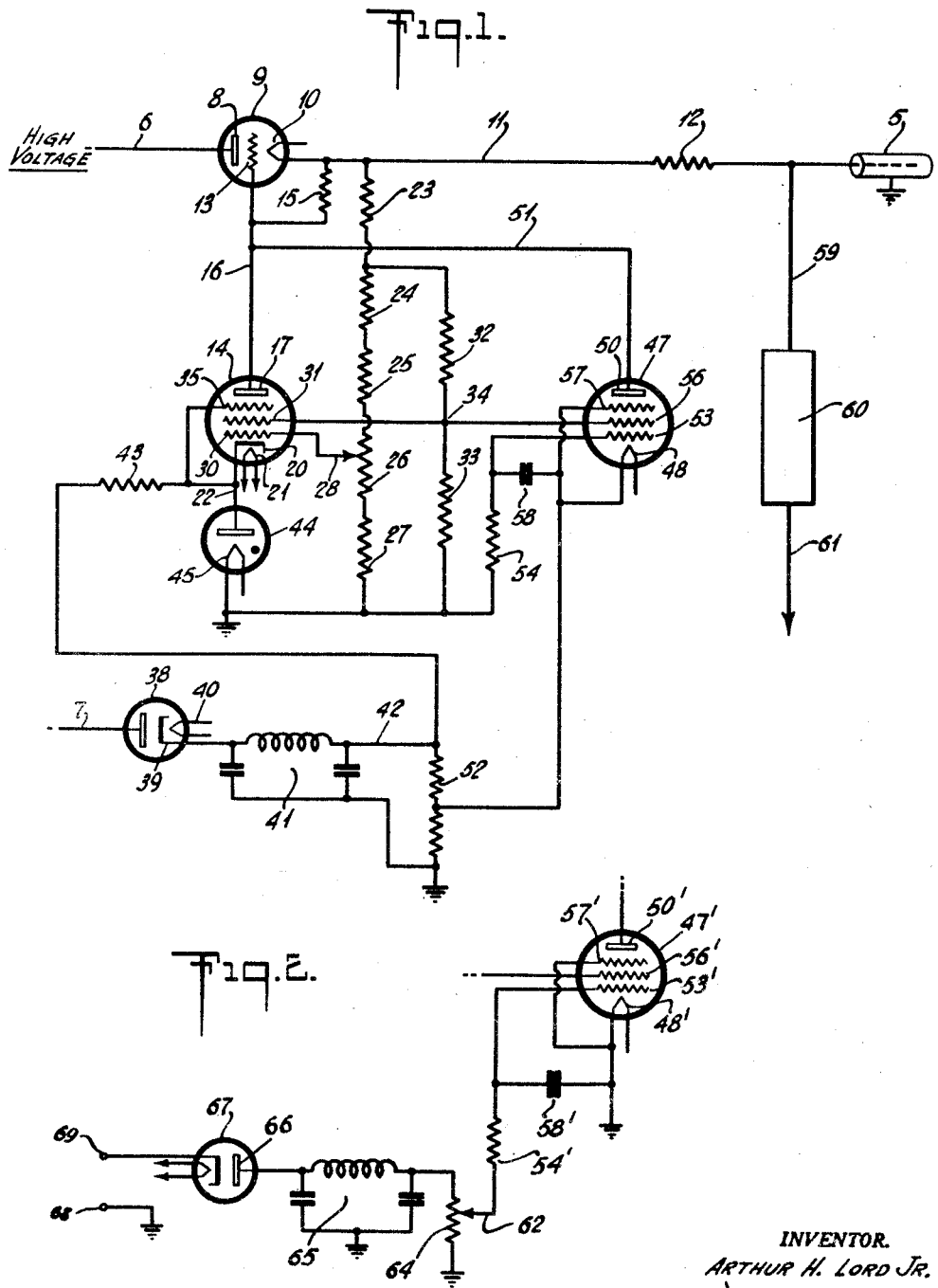

2,419,496

UNITED STATES PATENT OFFICE 2,419,496

VOLTAGE CONTROL AND STABILIZING CIRCUITS

Arthur H. Lord, Jr., Houston, Tex., assignor to The Texas Company, New York, N. Y., a corporation of Delaware Application April 10, 1945, Serial No. 587,504

11 Claims. (Cl. 171—312)

This invention relates to means for the regulation and control of direct current voltages and more particularly to the control of the voltages to be applied to instruments for the detection and measurement of radioactive intensity. It is more specifically intended for use in connection with instruments for radioactive logging of oil wells, bore-holes, and the like, and is an improvement upon the invention described and claimed in the co-pending application of Herzog and applicant, Serial No. 587,502, filed concurrently herewith.

In the radioactivity logging of oil wells and bore-holes, it is the practice to cause an instrument to travel through the bore-hole or the parts thereof to be logged, which instrument contains a detector of radiations and may or may not contain also a radioactive source, the radiation from which may affect the radiations from formations surrounding the bore-hole as the instrument passes them, or may induce radiations therefrom. In general, the instrument is suspended by a cable which contains one or more conductors through which electrical current is supplied from the surface to the instrument for operation thereof, and through which also the signals or output current derived from the radiation detector are transmitted to the surface. The power current transmitted from the surface to the instrument for the operation of the equipment contained therein may be a direct current or an alternating current. In either case, instrumentalities are provided within the instrument for converting the power current into currents of suitable voltages for operation of the equipment contained in the instrument. It is desirable that the direct current voltage applied to the radiation detector be carefully regulated and controlled to maintain it at a value or range of values for effective operation, which, particularly if the radiation detector be of the counter type, may vary with the temperature to which the instrument is subjected in the various zones through which it passes, as pointed out in the application of Herzog et al., hereinbefore referred to. The present invention relates to such regulation and control of the voltages applied to the radiation detectors, although, as is readily apparent, it may be used for other purposes.

In effecting the desired regulation and control of the current which is supplied to the electrodes of the radiation detector, or which may be used for other purposes, it is frequently desirable or necessary that the electronic tubes used for such regulation be of the indirectly heated type. In such case, there may be a period immediately after turning on the current supplied to the equipment in which the control is ineffective and excessively high voltages may be developed. In accordance with the present invention means are provided for preventing such initial development of excessive voltages or "over-shooting," such means becoming ineffective as the normal control means comes into operation. The invention will be more fully understood from the following description, illustrated by the accompanying drawing, in which Fig. 1 shows a circuit suitable for use in carrying out the invention as schematically shown; and Fig. 2 shows a modification of a portion of said circuit.

In Fig. 1 of the drawing the circuit involved is illustrated in connection with the supply of a high voltage direct current potential to the electrodes of a radiation detector 5, which is represented schematically by a simplified showing of its essential electrodes. This detector would suitably be one of the pulse-producing type, such as a Geiger-Muller counter or a high efficiency detector such as those shown in the U. S. Letters Patent of Hare and Herzog, No. 2,397,073, granted March 19, 1946, and the U. S. Letters Patent of Hare, No. 2,397,071, granted March 19, 1946. The equipment involved in the circuit illustrated in the drawing may be incorporated, for example, in a logging instrument if used in radioactivity well-logging, and in such case, where ground connections are shown, it is to be understood that such connections may be to the housing of the instrument containing the equipment.

Suitable equipment (not shown) is provided in the instrument for converting the power current into a direct current high voltage, higher than that which is to be impressed upon the electrodes of the detector 5, this direct current high voltage being taken from the conductor 6. Suitable means are also provided within the instrument for providing a lower voltage current, suitably an alternating current, which is impressed upon the conductor 7.

The conductor 6, carrying the high voltage direct current potential, is connected to the plate 8 of the electronic control tube 9, shown as a triode, for example, a 1H4–G tube. The cathode of this tube, which is directly heated, is connected through conductor 11 and resistor 12 to the anode of the detector 5 and the output voltage from the output tube 9 is thereby impressed across the detector electrodes.

The output voltage of the control tube 9 is controlled by its control grid 13, and this control is effected by means of the electronic regulator tube 14, which is in turn controlled by the output voltage from the control tube 9 in a manner generally similar to that known in the art, and which may or may not be modified to cause variations in the temperature to which the instrument is subjected to produce changes in the output voltage of the control tube 9, as shown in the application of Herzog and applicant hereinbefore referred to.

Referring more particularly to the circuits for the control of the output voltage of the control tube 9 by the regulator tube 14, the biasing resistance for the control grid 13 of the control tube 9 is indicated at 15. The control grid 13 is connected by conductor 16 to the plate 17 of the regulator tube, which is illustrated as a pentode, for example, a 7C7 tube. The plate current for the regulator tube 14 is supplied from the conductor 11 carrying the output from the control tube 9, through the resistor 15.

The cathode 20 of the regulator tube 14, which is indirectly heated by the filament 21, is connected to a conductor 22, and, in the embodiment illustrated, the voltage on cathode 20 is maintained at a substantially fixed positive voltage above ground voltage, represented by that of the instrument housing, as hereinafter set forth.

The circuits for supplying heating current to the various cathodes and heating elements of the electronic tubes shown in the drawing are not illustrated, since such circuits are well-known in the art and would unnecessarily complicate the drawings.

Between the conductor 11 carrying the output of the control tube 9 and the ground, there is provided a voltage divider made up of a series of resistors 23, 24, 25, 26 and 27, of which one, for example, 26, may be a potentiometer. From it a tap 28 takes a potential which is impressed upon the control grid 30 of the regulator tube 14. As is apparent, the position of the tap 28 on the potentiometer 26 may be selected to place the desired operating bias on the control grid of tube 14.

The resistors making up the voltage divider may be such that the voltage applied to the control grid 30 of the regulator tube 14 varies substantially only with changes in the output of the control tube 9, or they may be so constructed as to cause the bias voltage on the control grid 30 to change with temperature also, as described in the application of Herzog and applicant hereinbefore referred to. Thus all of the resistors except 24 and 25, or one of them, may be made of materials having low temperature coefficients of resistance, such as manganin, constantan, or the like, and one or both of the resistors 24 and 25 may be made of materials having higher temperature coefficients of resistance, such as copper, nickel, phosphor bronze, or the like.

Suitable means are provided for supplying the proper voltage for the screen grid 31 of the regulator tube 14 either from the input or the output of control tube 9. As illustrated, a voltage divider made up of resistors 32 and 33 may be connected in parallel with the resistors 24 to 27 between the resistor 23 and the ground, and the desired voltage for the screen grid may be taken from a point 34 between the resistors 32 and 33.

The suppressor grid 35 of the regulator tube 14 is connected with its cathode 20 and the suppressor grid is thereby maintained at the cathode voltage.

In order to maintain on the cathode 20 of the regulator tube 14 a suitable positive voltage above ground in the circuit illustrated, the cathode 20 is supplied with a stabilized positive voltage, which may suitably be done in the following manner.

An alternating current, derived in any suitable manner (not shown) from the power current, is supplied through conductor 7 to the plate of a diode rectifier 38, suitably a 6X5-GT tube, which has an indirectly heated cathode 39, heated by filament 40. Rectified current from the cathode of rectifier tube 38 is passed through a filter 41 to remove ripples and the resulting potential is then impressed upon the cathode 20 of the regulator tube 14 through resistor 43. This potential is stabilized by means of a gas filled diode or glow tube 44, such as a VR-105 tube, which is connected to the cathode 20 of the regulator tube 14 through the conductor 22. The cathode 45 of the diode 44 is grounded. The resistor 43 has a resistance selected to limit the current through the tube 44 to the desired value. Under normal operating conditions, by way of example, with a detector requiring a positive voltage of the order of 1000 to 1100 volts, the direct current supplied through the conductor 6 may be in the order of 2000 volts; that impressed upon the anode of the detector 5 in the order of 1000 to 1100 volts; the output current from the rectifier tube 38 may be in the order of 200 volts and that impressed upon the cathode of the regulator tube 14 in the order of 105 volts.

The control tube 9 being of the directly heated type and the regulator tube 14 of the indirectly heated type, the full value of the high voltage supply delivered through conductors 6 would appear in the counter circuit as soon as the unit is turned on and would not drop to the proper value until the control tube 14 has heated and for several seconds thereafter while the tube settles and the voltage regulating tube 44 reaches a stable point of operation. To prevent this initial development of excess voltage or overshooting, provision is made for a temporary control of the operation of the control tube 9, which temporary control is removed when conditions for steady operation are attained.

In order to accomplish this temporary control, a second regulator tube 47, suitably a 1LN5 tube, which has a directly heated cathode 48, is placed in parallel with regulator tube 14, its plate 50 being connected through conductor 51 to draw current through the resistor 15, and also with the control grid 13 of control tube 9. The cathode 48 of the temporary regulator tube 47 is connected to an intermediate point on a voltage divider 52, which is connected between the conductor 42 receiving the output from the rectifier tube 38 and the ground or instrument housing. The tube 38 is indirectly heated, as above set forth. The control grid 53 of the temporary regulator tube 47 is likewise grounded through the resistor 54. The screen grid 56 of the temporary regulator tube 47 is connected to the point 34 on the voltage divider between resistors 32 and 33, and the suppressor grid 57 is maintained at the same voltage as the cathode 48.

It will be apparent that, until the cathode of rectifier 38 is operating, there is no voltage above ground on the cathode 48 of tube 47, which is therefore unbiased, and tube 47 then draws current through the resistor 15. Since the plate 50 of the tube 47 is connected to the control grid 13 of the control tube 9, it effectively holds the output of the control tube 9 to a minimum value.

As the cathode of rectifier 38 becomes effective, a positive direct current potential is impressed upon the conductor 42 and from it upon the voltage divider 52, and the cathode 48 of the temporary regulator tube 47. Under these general conditions above referred to, this voltage may be in the order of 45 volts. A condenser 58 is inserted between the cathode 48 and the control grid 53 of tube 47. As the cathode takes on a positive potential above ground, a bias voltage appears between the cathode 48 and the control grid 53 of the tube 47, but due to the time delay caused by the capacity of condenser 58 and the resistance of resistor 54, this voltage requires a length of time to build up which depends upon the time constant of the circuit including the said resistance and capacity. This delay may be controlled by controlling the time constant, suitably by varying the resistance or the capacity or both, and may be as high as 15 to 20 seconds. It is made sufficiently long to permit the indirectly heated element 14 to heat up and come into operation. The bias voltage which then appears between the cathode 48 and control grid 53 of the tube 47 is sufficient to bias the tube beyond cut-off and prevent further flow of current therethrough. The tube 47 is thereupon placed out of operation and normal control of the voltage through the tube 14 continues.

As is apparent, the tube 47 may also function to prevent excessive voltage being impressed upon the electrodes of the detector 5 in case the rectifier tube 38 is put out of action by accident.

As further illustrative of an embodiment of the circuit, under the general conditions of operation as hereinbefore set forth, the resistance of resistor 15 may be in the order of 5 megohms. The combined resistances of the resistors 23 and 27 may be in the order of 1 megohm and that of the resistors on the low voltage side of the voltage divider formed by these resistors may be from 150,000 to 200,000 ohms. The resistance of resistor 54 may be in the order of 10 megohms and the capacity of condenser 58 in the order of 2 microfarads.

In normal operation of the system, the controlled voltage desired from the control tube 9 is impressed upon the anode of the radiation detector 5, and pulses resulting from the operation of the latter are delivered through conductor 59 to the amplifying circuit 60, from which the amplified pulses are transmitted through conductor 61 to any suitable recording or indicating mechanism, or in case of well-logging, to the cable by which the pulses are transmitted to the usual recording or indicating mechanism.

In the embodiment of the invention as described above, direct current voltages lower than ground (or that of the instrument housing) have not been employed. In Fig. 2 a modification of a portion of the circuit is illustrated in which, instead of biasing the grid of temporary regulator tube 47 by impressing a positive voltage on its cathode, it is biased by impressing a negative voltage on the grid. In this modification the circuits of Fig. 1 are unchanged except for the modification of the cathode and grid circuits of tube 47, and consequently in Fig. 2, only these modified circuits are shown.

In Fig. 2, elements corresponding to the same elements of Fig. 1 are indicated by the same numerals with a prime ('). The cathode 48' of the temporary regulator tube 47', instead of being connected to receive a positive voltage as in Fig. 1, is connected to ground. The control grid 53' of tube 47' is not connected to ground as in Fig. 1, but is connected through resistor 54' to a tap 62 on a potentiometer 64, one end of which is grounded. The other end of potentiometer 64 is connected through filter 65 to the plate 66 of a diode rectifier 67, which is of the indirectly heated type. Alternating current is supplied to the terminals 68 and 69, of which the former is grounded and the latter is connected to supply alternating current to the cathode of rectifier tube 67. This alternating current is supplied at the same time as current is supplied to the other parts of the system, as in Fig. 1.

When current is first supplied to the system, both the cathode 48' and the grid 53' of temporary regulator tube 47' are grounded and there is no bias on this tube, which therefore operates at this stage in the same manner as tube 47 in the circuit of Fig. 1, preventing over-shooting of the output voltage of tube 9. As the cathode of rectifier tube 67 heats and this tube becomes operative, a negative voltage is impressed on potentiometer 64 and through it upon the control grid 53' of temporary regulator tube 47', biasing this tube. By properly setting the position of tap 62 on potentiometer 64, the bias developed will be beyond cut-off, thus making tube 47' inoperative. In order to put a time delay in the development of the bias voltage on tube 47' the condenser 58' may be inserted between the resistor 54' and the ground connection of the cathode 48'.

Although the present invention has been described in connection with the specific details of certain embodiments thereof, it is not intended that these shall be regarded as limitations upon the scope of the invention, except in so far as included in the accompanying claims.

I claim:

1. In a voltage control circuit including an electronic control tube for reducing an applied direct current voltage to a lower controlled voltage, said control tube having a directly heated cathode and a control grid for controlling current flow through said control tube, and an electronic regulator tube for controlling the flow of current in said control tube, said regulator tube having an indirectly heated cathode, a plate connected to the grid of the control tube and a control grid deriving its impressed controlling bias voltage from the output of said control tube, means for preventing uncontrolled operation of the control tube during inactivity of the regulator tube while heating after current flow has been initiated, said means comprising a second electronic regulator tube having a directly heated cathode, an anode connected to the control grid of the control tube, and a control grid, means for connecting both the cathode and control grid of said second regulator tube to a point of lower potential, whereby said second regulator tube is at zero-bias and current flows therethrough, thereby biasing the control grid of the control tube to reduce the flow of current therethrough, and means for impressing a higher positive potential upon the cathode of said second regulator tube to bias the same and stop current flow therethrough comprising a source of current including an indirectly heated electronic tube in series, whereby the flow of current therethrough to bias said second regulator tube is delayed during the heating period of said electronic tube and the first regulator tube, and the second regulator tube becomes inoperative upon the first regulator tube reaching operative condition.

2. In a voltage control circuit including an electronic control tube for reducing an applied direct current voltage to a lower controlled voltage, said control tube having a directly heated cathode and a control grid for controlling current flow through said control tube, and an electronic regulator tube for controlling the flow of current in said control tube, said regulator tube having an indirectly heated cathode, a plate connected to the grid of the control tube and a control grid deriving its impressed controlling bias voltage from the output of said control tube, means for preventing uncontrolled operation of the control tube during inactivity of the regulator tube while heating after current flow has been initiated, said means comprising a second electronic regulator tube having a directly heated cathode, an anode connected to the control grid of the control tube, and a control grid, means for connecting both the cathode and control grid of said second regulator tube to a point of lower potential, whereby said second regulator tube is at zero-bias and current flows therethrough, thereby biasing the control grid of the control tube to reduce the flow of current therethrough, and means for producing a potential difference between the cathode and control grid of said second regulator tube to bias the same and stop current flow therethrough comprising a source of current including an indirectly heated electronic tube in series, whereby the flow of current therethrough to bias said second regulator tube is delayed during the heating period of said electronic tube and the first regulator tube, and the second regulator tube becomes inoperative upon the first regulator tube reaching operative condition.

3. In a voltage control circuit including an electronic control tube for reducing an applied direct current voltage to a lower controlled voltage, said control tube having a directly heated cathode and a control grid for controlling current flow through said control tube, and an electronic regulator tube for controlling the flow of current in said control tube, said regulator tube having an indirectly heated cathode, a plate connected to the grid of the control tube and a control grid deriving its impressed controlling bias voltage from the output of said control tube, means for preventing uncontrolled operation of the control tube during inactivity of the regulator tube while heating after current flow has been initiated, said means comprising a second electronic regulator tube having a directly heated cathode, an anode connected to the control grid of the control tube, and a control grid, means for connecting both the cathode and control grid of said second regulator tube to a point of lower potential, whereby said second regulator tube is at zero-bias and current flows therethrough, thereby biasing the control grid of the control tube to reduce the flow of current therethrough, and means for impressing a greater negative potential on the control grid of said second regulator tube to bias the same and stop current flow therethrough comprising a source of current including an indirectly heated electronic tube in series, whereby the flow of current therethrough to bias said second regulator tube is delayed during the heating period of said electronic tube and the first regulator tube, and the second regulator tube becomes inoperative upon the first regulator tube reaching operative condition.

4. In a voltage control circuit including an electronic control tube for reducing an applied direct current voltage to a lower controlled voltage, said control tube having a directly heated cathode and a control grid for controlling current flow through said control tube, and an electronic regulator tube for controlling the flow of current in said control tube, said regulator tube having an indirectly heated cathode, a plate connected to the grid of the control tube and a control grid deriving its impressed controlling bias voltage from the output of said control tube, additional means for controlling operation of the control tube upon initiating current flow through the system and while said regulator tube is heating, said means comprising a second electronic regulator tube having a directly heated cathode, an anode connected to the control grid of the control tube, and a control grid, means for connecting both the cathode and control grid of said second regulator tube to a point of lower potential, whereby said second regulator tube is unbiased and current flows therethrough, thereby biasing the control grid of the control tube to prevent uncontrolled flow of current therethrough, and means for impressing a higher positive potential on the cathode of said second regulator tube to bias the same and stop current flow therethrough, which comprises a source of such potential and a circuit connected to said source including a resistance and a capacity to produce a time delay in said circuit.

5. In a voltage control circuit including an electronic control tube for reducing an applied direct current voltage to a lower controlled voltage, said control tube having a directly heated cathode and a control grid for controlling current flow through said control tube, and an electronic regulator tube for controlling the flow of current in said control tube, said regulator tube having an indirectly heated cathode, a plate connected to the grid of the control tube and a control grid deriving its impressed controlling bias voltage from the output of said control tube, additional means for controlling operation of the control tube upon initiating current flow through the system and while said regulator tube is heating, said means comprising a second electronic regulator tube having a directly heated cathode, an anode connected to the control grid of the control tube, and a control grid, means for connecting both the cathode and control grid of said second regulator tube to a point of lower potential, whereby said second regulator tube is unbiased and current flows therethrough, thereby biasing the control grid of the control tube to prevent uncontrolled flow of current therethrough, and means for impressing a biasing voltage between the cathode and control grid of said second regulator tube to bias the same and stop current flow therethrough, which comprises a source of such potential and a circuit connected to said source including a resistance and a capacity to produce a time delay in said circuit.

6. In a voltage control circuit including an electronic control tube for reducing an applied direct current voltage to a lower controlled voltage, said control tube having a directly heated cathode and a control grid for controlling current flow through said control tube, and an electronic regulator tube for controlling the flow of current in said control tube, said regulator tube having an indirectly heated cathode, a plate connected to the grid of the control tube and a control grid deriving its impressed controlling bias voltage from the output of said control tube, additional means for controlling operation of the control tube upon initiating current flow through the system and while said regulator tube is heating, said means comprising a second electronic regulator tube having a directly heated cathode, an anode connected to the control grid of the control tube, and a control grid, means for connecting both the cathode and control grid of said second regulator tube to a point of lower potential, whereby said second regulator tube is unbiased and current flows therethrough, thereby biasing the control grid of the control tube to prevent uncontrolled flow of current therethrough, and means for impressing a greater negative potential on the control grid of said second regulator tube, which comprises a source of such potential and a circuit connected to said source including a resistance and a capacity to produce a time delay in said circuit.

7. In a voltage control circuit including an electronic control tube for reducing an applied direct current voltage to a lower controlled voltage, said control tube having a directly heated cathode and a control grid for controlling current flow through said control tube, and means for controlling the flow of current in said control tube, including an indirectly heated electronic regulator tube having its plate circuit connected with the control grid of the control tube, means for preventing uncontrolled operation of the control tube during inactivity of the regulator tube while heating comprising a second directly heated electronic regulator tube having its plate circuit connected with the control grid of the control tube, said second regulator tube being unbiased when current flow through the system is initiated, whereby current flows therethrough, thereby biasing the control grid of the control tube to prevent uncontrolled flow of current therethrough, and delayed means operable after current flow through the system is initiated for impressing a higher positive potential upon the cathode of said second regulator tube, whereupon said tube becomes biased and current flow therethrough ceases when the first regulator tube has been heated to operative condition.

8. In a voltage control circuit including an electronic control tube for reducing an applied direct current voltage to a lower controlled voltage, said control tube having a directly heated cathode and a control grid for controlling current flow through said control tube, and means for controlling the flow of current in said control tube, including an indirectly heated electronic regulator tube having its plate circuit connected with the control grid of the control tube, means for preventing uncontrolled operation of the control tube during inactivity of the regulator tube while heating comprising a second directly heated electronic regulator tube having its plate circuit connected with the control grid of the control tube, said second regulator tube being unbiased when current flow through the system is initiated, whereby current flows therethrough, thereby biasing the control grid of the control tube to prevent uncontrolled flow of current therethrough, and delayed means operable after current flow through the system is initiated for impressing a bias voltage between the cathode and control grid of said second regulator tube, whereupon current flow therethrough ceases when the first regulator tube has been heated to operative condition.

9. In a voltage control circuit including an electronic control tube for reducing an applied direct current voltage to a lower controlled voltage, said control tube having a directly heated cathode and a control grid for controlling current flow through said control tube, and means for controlling the flow of current in said control tube, including an indirectly heated electronic regulator tube having its plate circuit connected with the control grid of the control tube, means for preventing uncontrolled operation of the control tube during inactivity of the regulator tube while heating comprising a second directly heated electronic regulator tube having its plate circuit connected with the control grid of the control tube, said second regulator tube being unbiased when current flow through the system is initiated, whereby current flows therethrough, thereby biasing the control grid of the control tube to prevent uncontrolled flow of current therethrough, and delayed means operable after current flow through the system is initiated for impressing a negative potential upon the control grid of said second regulator tube, whereupon said tube becomes biased and current flow therethrough ceases when the first regulator tube has been heated to operative condition.

10. In a voltage control circuit including an electronic control tube for reducing an applied direct current voltage to a lower controlled voltage, said control tube having a directly heated cathode and a control grid for controlling current flow through said control tube, and an electronic regulator tube for controlling the flow of current in said control tube, said regulator tube having an indirectly heated cathode, a plate connected to the grid of the control tube and a control grid deriving its impressed controlling bias voltage from the output of said control tube, means for preventing uncontrolled operation of the control tube during inactivity of the regulator tube while heating after current flow has been initiated, said means comprising a second electronic regulator tube having a directly heated cathode, an anode connected to the control grid of the control tube, and a control grid, means for connecting both the cathode and control grid of said second regulator tube to a point of minimum potential, whereby said second regulator tube is unbiased and current flows therethrough, thereby biasing the control grid of the control tube to prevent uncontrolled flow of current therethrough, and means for impressing a delayed higher positive potential upon the cathode of said second regulator tube, whereupon said tube becomes biased and current flow therethrough ceases.

11. In a voltage control circuit, an electronic control tube for reducing an applied direct current voltage to a lower controlled voltage, said control tube having a directly heated cathode and a control grid for controlling current flow through said control tube, and means for controlling the flow of current in said control tube, including an indirectly heated electronic regulator tube having its plate circuit connected with the control grid of the control tube and a voltage stabilizing tube in series therewith, means for preventing uncontrolled operation of the controlled tube during inactivity of the regulator tube while heating comprising a second electronic regulator tube having a directly heated cathode, an anode connected to the control grid of the control tube, and a control grid, means for connecting both the cathode and control grid of said second regulator tube to a point of minimum potential, whereby said second regulator tube is unbiased and current flows therethrough, thereby biasing the control grid of the control tube to prevent uncontrolled flow of current therethrough, and means for impressing a higher positive potential upon the cathode of said second regulator tube, to bias the same and stop current flow therethrough upon the first regulator tube reaching operative condition which comprises a source of current including an indirectly heated electronic tube in series, whereby the flow of current therethrough is delayed during the heating period of said electronic tube and said first regulator tube, a circuit connected to said electronic tube including a capacity and a resistance to produce a time delay in said circuit, and a connection between said circuit and the cathode of the second regulator tube to impress a delayed higher voltage thereon.

ARTHUR H. LORD, Jr.

REFERENCES CITED

The following references are of record in the file of this patent:

UNITED STATES PATENTS

| Number | Name | Date |
|---|---|---|
| 2,301,343 | Tarr | Nov. 10, 1942 |